US010439657B2

(12) United States Patent
Pillai et al.

(10) Patent No.: US 10,439,657 B2
(45) Date of Patent: Oct. 8, 2019

(54) OVERHEAD COMMUNICATIONS WITH WIRELESS WEARABLE DEVICES

(71) Applicant: Intel Corporation, Santa Clara, CA (US)

(72) Inventors: Unnikrishnan G. Pillai, Bangalore (IN); Chetan Verma, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 68 days.

(21) Appl. No.: 15/668,534

(22) Filed: Aug. 3, 2017

(65) Prior Publication Data

US 2019/0044549 A1     Feb. 7, 2019

(51) Int. Cl.
| H03C 7/02 | (2006.01) |
| H04B 1/00 | (2006.01) |
| G02B 27/01 | (2006.01) |
| H04W 4/70 | (2018.01) |

(52) U.S. Cl.
CPC ......... *H04B 1/0064* (2013.01); *G02B 27/017* (2013.01); *H04W 4/70* (2018.02)

(58) Field of Classification Search
CPC ......... H04W 12/06; H04W 4/08; H04W 4/80; H04W 72/0446; H04W 72/1278; H04W 84/20; H04W 88/005; H05B 1/0227; H05B 1/0252; H05B 2203/011; H05B 2203/016; H05B 3/84

USPC .................................................. 455/101
See application file for complete search history.

(56) References Cited

U.S. PATENT DOCUMENTS

| 6,900,777 B1 * | 5/2005 | Hebert ................. G02B 27/017 345/30 |
| 9,544,054 B1 | 1/2017 | Tiecke et al. |
| 2014/0187179 A1 * | 7/2014 | Ferguson ................. H01Q 3/24 455/77 |
| 2014/0235169 A1 * | 8/2014 | Parkinson ............... G06F 3/012 455/41.2 |
| 2017/0285754 A1 * | 10/2017 | Holman .................. G06F 1/163 |
| 2018/0256115 A1 * | 9/2018 | Campbell ................ A61B 3/14 |

FOREIGN PATENT DOCUMENTS

KR      20160112570     9/2016

* cited by examiner

*Primary Examiner* — Ajibola A Akinyemi
(74) *Attorney, Agent, or Firm* — Hanley, Flight & Zimmerman, LLC

(57) ABSTRACT

Overhead communications with wireless wearable devices are disclosed. An example overhead wireless transmission interface apparatus includes a fixture to be mounted above a wearable device, where the wearable device includes a first antenna, and a base station associated with a second antenna, the second antenna coupled to the fixture and to wirelessly communicate with the first antenna, where at least one of the first antenna or the second antenna is circular polarized or diversity polarized.

19 Claims, 8 Drawing Sheets

OVERHEAD COMMUNICATIONS WITH WIRELESS WEARABLE DEVICES

FIELD OF THE DISCLOSURE

This disclosure relates generally to high bandwidth wearable device applications and, more particularly, to overhead communications with wireless wearable devices.

BACKGROUND

In recent years, head-mounted virtual reality devices have been used to provide immersive experiences for users. These systems often employ a mounted headset including goggles with screen displays corresponding to each eye of a user to convey the illusion of movement or presence in a displayed environment. Depending on the resolution of the screen display used for each eye, relatively high signal communication rates, bandwidth and/or data throughput may be required to drive each of the screen displays as well as support other functions of the headset.

Known virtual reality headsets are often wired to a host computer so that the host computer can drive multiple displays while providing the necessary bandwidth and/or data communication rates to these displays. However, these wired systems can be cumbersome and/or limit motion of a user. In particular, wires and/or cable assemblies used to provide the data to the displays may cause undesirable pulling or resistance on a user.

Some known wireless virtual reality headsets utilize multiple radio modules mounted to a single headset to account for a relatively narrow data transmission coverage zone (e.g., a high data rate coverage zone) of a base station to which the radio modules communicate. In particular, communication rates and/or signal integrity of a radio module can greatly decrease when the radio module is not oriented and/or within the data transmission coverage zone due to relative narrowness of the transmission coverage zone when the user turns around, ducks, shifts laterally and/or bends during a virtual reality experience (e.g., a virtual reality game). In such known headsets, each of the RF modules have to be simultaneously powered on during the use and one of the RF modules that face the base station is selected based on the user orientation which, in turn, is calculated using data from sensors, such as accelerometers and gyroscopes. Accordingly, such known headsets can also have tracking ranges as well as coverage gaps (e.g., orientation coverage gaps), which can result in decreased communication rates and/or decreased signal integrity, thereby potentially causing loss of functionality and/or fidelity of these head-mounted displays.

Figure 1B:
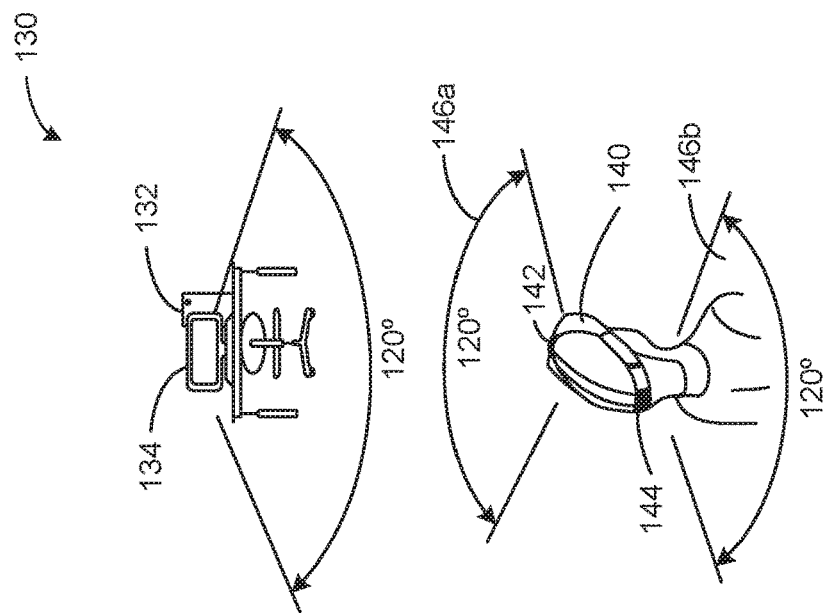
FIG. 1B illustrates a known wireless virtual reality system.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Overhead communications with wireless wearable devices are disclosed. Known virtual reality systems typically include a wired connection to a wearable device such as a headset so that data communication rates (e.g., transmission rates, transmit/receive rates, wireless communication rates, etc.) needed to drive multiple displays of the headset can be maintained. However, these wired systems can be cumbersome, limit motion of a user and/or hinder a virtual reality experience.

Some known wireless headsets employ multiple transceiver/radio modules to maintain the necessary wireless communication rates to drive their respective goggle displays. However, these known wireless headsets can have tracking gaps (e.g., tracked only at certain orientations), orientations that result in intermittent data connections and/or orientations in which data communication rates are reduced such as when data transmission is transferred between the transceiver modules (e.g., during a handoff).

The examples disclosed herein enable sustained high bandwidth wireless communication rates (e.g., transmission rates that support Wireless Gigabit Alliance (WiGig) protocols) as well as stability of these high communication rates between a base station (e.g., a computer) and a head-mounted device by utilizing a combination of overhead mounting in conjunction with polarized data transmission signals so that an antenna of the head-mounted device can be directed towards a relatively large coverage zone (e.g., a high data rate communication zone, broad-side communication sector(s), etc.) to maintain high bandwidth communications/transmissions to the base station transceiver when the head-mounted device is significantly rotated and/or translated. The example transceivers in communication with such an antenna may be implemented as a transmitter/receiver pair that is wired to a personal computer, which functions as a base station.

The examples disclosed herein enable maintenance of high bandwidth data rates at almost any orientation of the head-mounted device by utilizing upward/downward orientations of paired transceiver antennas in combination with circular or diversity polarized antennas to maintain relative alignment as the head-mounted device is translated and/or rotated (e.g., by a user when engaging in a virtual reality application/program). Some of the examples disclosed herein utilize overhead signal reflectors to maintain these high bandwidth data rates.

As used herein the term "fixture" can refer to any mounting structure including, but not limited to, a ceiling, a ceiling mount, a fastening device to suspend another item, a beam, a structure, a cable (e.g., a tension cable, a vertical tension cable), an overhead mounting bracket, an elevated mount of a vertical wall and/or a roof mount, etc. As used herein, the term "antenna" can refer to a single antenna or an antenna array having multiple antennas and/or antenna elements. Accordingly, a polarization diversity antenna can encompass an antenna having discrete antennas/antenna elements (e.g., orthogonally arranged antennas).

Figure 1A:
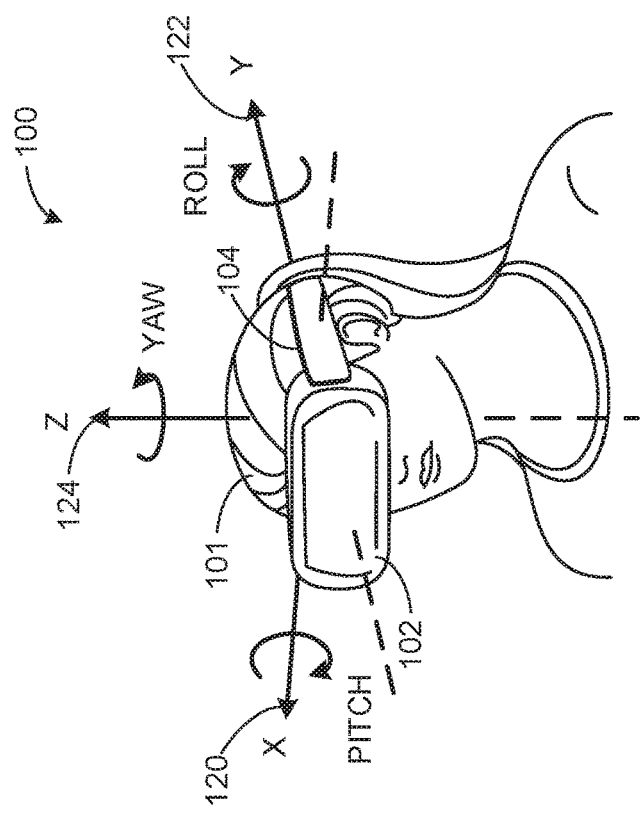
FIG. 1A illustrates a known head-mounted virtual reality headset in which the examples disclosed herein may be implemented.

FIG. 1A illustrates a known head-mounted virtual reality headset 100 in which the examples disclosed herein may be implemented. The headset 100, which is worn by a user 101, includes goggles (e.g., portable screen goggles, display goggles) 102 with a headband 104 to hold the headset 100 in place relative to a head of the user 101. According to the illustrated example, the headset 100 may be translated (e.g., when the user 101 moves) and/or rotated in at least three rotational axes, which are depicted as axes 120, 122 and 124 corresponding to a pitch, a roll and a yaw, respectively, of the headset 100.

In operation, the user 101 is provided with images displayed on screens of the goggles 102, thereby providing an effect of a stereoscopic image to the user 101. In this example, the goggles 102 include two displays corresponding to respective eyes of the user 101. According to the illustrated example, movement of the headset 100 caused by movement of the user 101 is monitored to control and/or direct images (e.g., rendered images) or video provided to the user 101 via the goggles 102.

FIG. 1B illustrates a known wireless virtual reality system 130. The virtual reality system 130 includes a base station (e.g., a desktop computer) 132 with a wireless transceiver (e.g., a transmitter/receiver, a wireless virtual reality signal hub, etc.) 134. In this example, a headset 140 is wirelessly communicatively coupled to the base station 132 via the wireless transceiver 134. According to the illustrated example, the headset 140 includes a first radio front end module (RFEM) 142 and a second RFEM 144, both of which are radio communication modules/circuits and/or antenna arrays that are oriented to face in opposed directions. In particular, the first RFEM 142 is oriented towards a front of the user while the second RFEM 144 is oriented towards the back of the user. The first RFEM 142 and the second RFEM 144 have respective first and second transmission zones (e.g., areas above a threshold data transfer rate) 146a, 146b. In other words, both the first RFEM 142 and the second RFEM 144 have limited communication viewing angles (e.g., line-of-sight angles) that are indicated as angular ranges (e.g., cones, elliptical cones, etc.). In this particular example, each of the first and second transmission zones 146a, 146b has an approximate angular coverage band of 120 degrees.

In operation, the first RFEM 142 communicates, transfers and/or exchanges data (e.g., display/rendering data for goggles of the headset 140) with the transceiver 134 when the first transmission zone 146a is oriented towards and positioned within a communication range and/or communication viewing angle (e.g., a communication view port) of the transceiver 134. In other words, data transmission between the headset 140 and the transceiver 134 is dependent on an orientation and/or position of the headset 140. Accordingly, the second RFEM 144 transfers and/or exchanges data with the transceiver 134 when the second transmission zone 146b is within the communication range and/or communication viewing angle of the second RFEM 144. While the example virtual reality system 130 can transition communication with the transceiver 134 between the first RFEM 142 and the second RFEM 144, the virtual reality system 130 includes communication gaps when motion and/or rotation of the user causes a transition between the first and second transmission zones 146a, 146b.

In this example, the first RFEM 142 and the second RFEM 144 operate as a phased array, in which one of the RFEMs 142, 144 is selected to create a data transmission link based of a respective gain at a given time. In particular, one of the first and second RFEMs 142, 144 is selected to be in wireless communication with the transceiver 134. However, when transitioning between the first RFEM 142 and the second RFEM 144 (and vice-versa) such as during a handoff therebetween, a significant drop in signal strength may occur, thereby resulting in decreased communication rates, interruption and/or data loss.

Figure 1C:
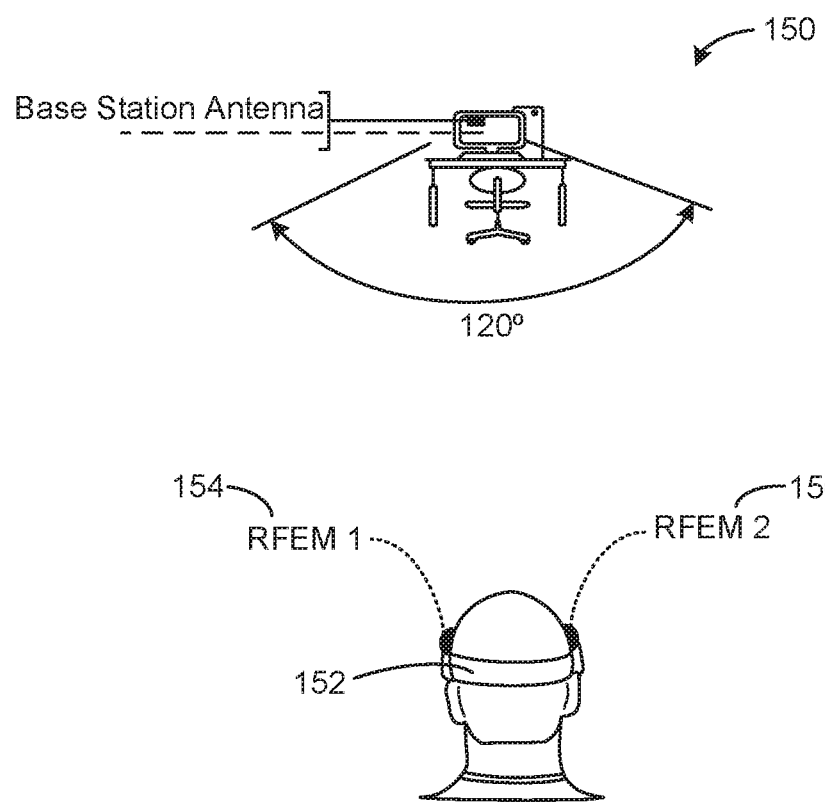
FIG. 1C illustrates another known wireless virtual reality system.

FIG. 1C illustrates another known wireless virtual reality system 150. The wireless virtual reality system 150 is similar to that shown in FIG. 1B, but includes a headset 152 with both a first RFEM 154 as well as a second RFEM 156 mounted to an anterior portion of the headset 152 instead of being positioned at opposed sides of a user's head, as shown with the example headset 140 of FIG. 1B. Further, in a manner similar to that described in FIG. 1B, the first RFEM 154 and the second RFEM 156 operate as phased arrays. In this example, the handoff between and/or transition between the first RFEM 154 and the second RFEM 156 can cause a decreased communication rate. Further, certain orientations of the headset 152 can cause lapses or gaps in data transmissions from both of the RFEMs 154, 156.

Figure 2:
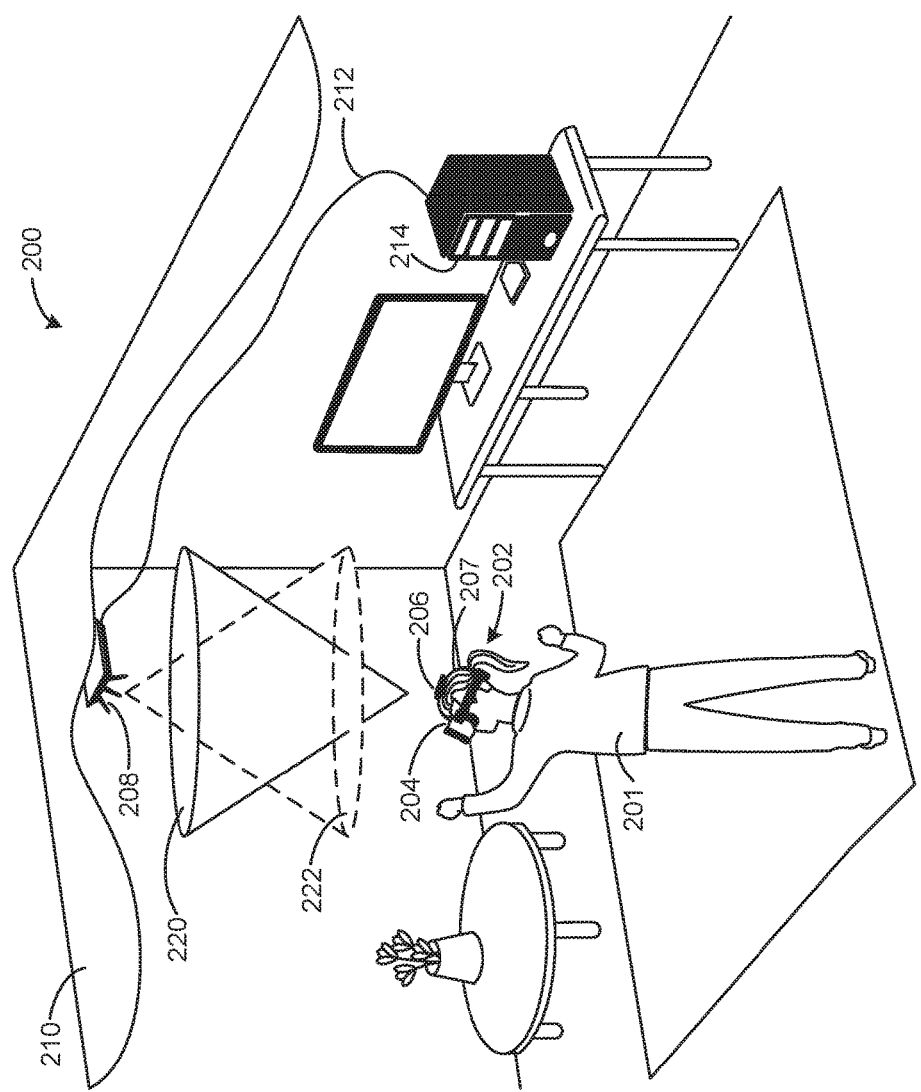
FIG. 2 illustrates an example wireless virtual reality system in accordance with the teachings of this disclosure.

FIG. 2 illustrates an example wireless virtual reality system 200 in accordance with the teachings of this disclosure. The wireless virtual reality system 200 of the illustrated example includes a wearable device 202, which is implemented as virtual reality goggles worn by a user 201. The example wearable device 202 includes goggles/screen mounts 204, and an antenna 206 positioned by an overhead strap 207 and mounted to an upper portion of the wearable device 202. The example antenna 206 is oriented in a generally upward direction when the user 201 is wearing the wearable device 202. The example virtual reality system 200 also includes an antenna 208 that is mounted to an overhead fixture (e.g., an overhead support or beam, an overhead mount, a ceiling, etc.) 210, which is a ceiling in this example. The antenna 208 of the illustrated example is oriented in a generally downward facing direction and is communicatively coupled to a base station (e.g., a computer) 214 via a cable 212. In this example, the base station 214 generates or provides graphic or image information to be displayed on the goggles 204.

To maintain data throughput and/or necessary data rates to maintain visual fidelity (e.g., a displayed resolution) of a display associated with the goggles 204, the antenna 206 that is oriented in a direction generally upward towards the antenna 208 (in the view of FIG. 2), thereby defining a signal coverage area (e.g., a signal coverage area cone) 220 and, likewise, the antenna 208 that is generally oriented downwards defines a signal coverage area 222 that is oriented towards the antenna 206. Further, at least one of the antenna 206 or the antenna 208 implements polarization diversity or circular polarization. By defining the signal coverage area 220 and the signal coverage area 222 in conjunction with this polarization, high bandwidth transmissions can be effectively maintained between the base station 214 and the wearable device 202 even when the user 201 moves relatively quickly (e.g., rotates spins, spins to turn, etc.) and/or produces significant lateral movements that would otherwise fall outside of the typically narrow direct coverage range of known antennas. As a result, in some examples, only a single antenna pair may be needed to maintain minimum signal throughput to the wearable device 202, in some examples. In contrast and as described in connection with FIGS. 1A-1C, many known systems employ multiple antennas and/or RFEMs, which can have numerous associated complexities (e.g., related to handoffs) as well as increased cost.

As mentioned above, at least one of the antenna 206 or the antenna 208 is circular polarized and/or diversity polarized. For example, linear antenna elements of the antenna 206 and/or the antenna 208 may be positioned or assembled to be perpendicular to one another. In some examples, the antenna 206 and the antenna 208 have similar and/or the same polarization (e.g., both of the antenna 206 and the antenna 208 are circular polarized, a matching polarization). In examples where both of the antenna 206 and the 208 are circular polarized, for example, the antenna 206 and the 208 may be either right hand circular polarized or left hand circular polarized. In other examples, the antenna 206 and the antenna 208 have different polarizations. In this example, the antenna 206 and the antenna 208 communicate via a Wireless Gigabit Alliance (WiGig) standard. However, any appropriate communication standard and/or protocol may be used instead.

While the example antenna 206 directly faces directly upward (in the view of FIG. 2) towards the antenna 208, in some examples, the antenna 206 may be tilted away (e.g., five degrees away, fifteen degrees away, or any appropriate angle) from the antenna 206. While the fixture 210 of the example in FIG. 2 is a ceiling, the fixture 210 may be implemented as an overhead mount, an overhead beam and/or or a tension member (e.g., a vertical cable, a vertical bar/beam, a hanging cable, etc.).

In some examples, the cable 212 transmits signals between the antenna 208 and the base station 214 using the Thunderbolt or HDMI standard. However, any appropriate data transmission protocols(s) may be used. In some other examples, the antenna 206 is mounted to a mechanical leveling or stabilizing device (e.g., a gyroscope, a gimbal, an automated actuator and/or a leveler, etc.) that maintains an orientation of the antenna 206 in a generally upwards direction (in the view of FIG. 2) even when the user 201 moves and/or rotates/turns.

While the example disclosed in connection with FIG. 2 and, more generally, the examples disclosed herein are directed to virtual reality systems, the examples disclosed herein may be applied to any wireless transmission and/or line-of-sight data transmission application. Accordingly, any of the examples disclosed herein may be applied to any application necessitating high bandwidth and/or high frequency data transmissions over relatively wide areas of coverage.

Figure 3:
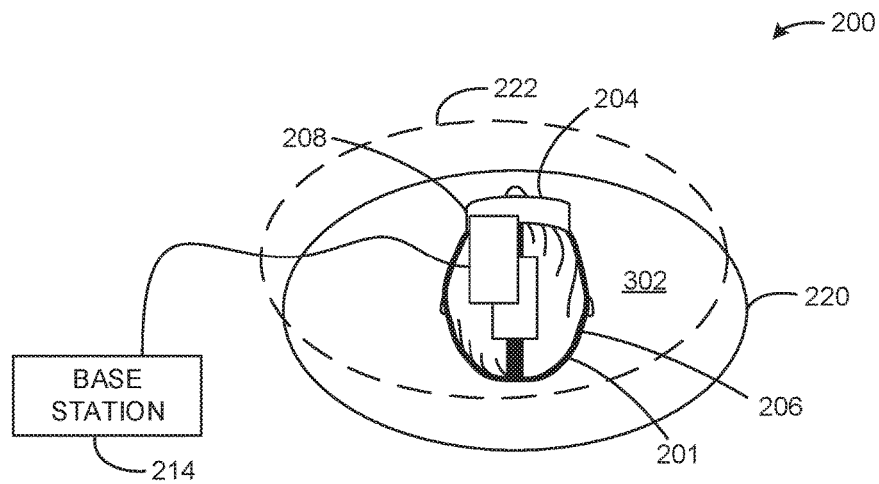
FIG. 3 is an overhead view illustrating relative antenna coverage zones of the example wireless virtual reality system of FIG. 2.

FIG. 3 is an overhead view of the example wireless virtual reality system 200 of FIG. 2 illustrating relative antenna coverage zones. According to the view of FIG. 3, the antenna 206 defines the aforementioned signal coverage area 220 while the antenna 208 defines the signal coverage area 222, which overlaps with the signal coverage area 220 to define an overlap region 302 therebetween. The overlap region 302 enables significant lateral movement (e.g., left to right movement in the view of FIG. 3) to occur with little or no transmission data rate loss. In other words, the overlap region 302 defined by both the signal coverage area 220 and the signal coverage area 222 enables relatively high data transmission to and from the base station 214 when the user 201 makes significant movements.

Figure 4:
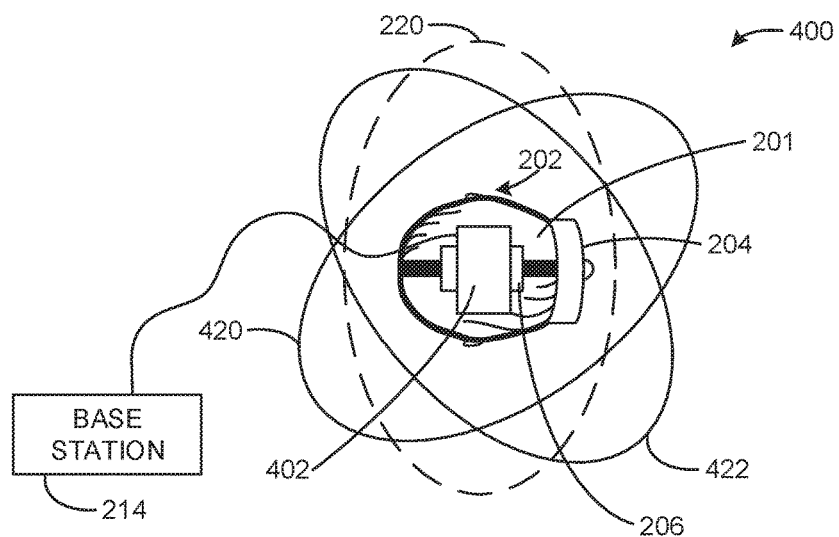
FIG. 4 is an overhead view illustrating relative antenna coverage zones of an alternative example virtual reality system.

FIG. 4 is an overhead view of an alternative example virtual reality system 400 illustrating relative antenna coverage zones. In contrast to the wireless virtual reality system 200 shown in FIGS. 2 and 3, the example virtual reality system 400 includes a diversity polarized antenna 402 defining an extended overlap area between the antenna 402 and the antenna 206 to maintain relatively high bandwidth data transmission rates to support driving a display of the goggles 204. In particular, the antenna 402 of the illustrated example includes multiple antennas (e.g., an antenna array of two or more antennas and/or antenna arrays) that are arranged orthogonal to one another to define the extended overlap region. As a result of the extended overlap region, thereby enabling the user 201 to make significant movements in multiple directions without compromising fidelity of the experience.

According to the illustrated example, the aforementioned signal coverage area 220 that corresponds to the antenna 206 is shown. Further, FIG. 4 also depicts a first coverage zone 420 and a second coverage zone 422, both of which correspond to orthogonally arranged antennas/antenna elements of the diversity polarized antenna 402. As can be seen in this example, the first coverage zone 420 and the second coverage zone 422 provide significant overlap to ensure that relatively high bandwidth data rates are sustained, thereby enabling the user 201 to move in multiple directions and/or orientations without significant reduction in the rate at which data is transmitted to the wearable device 202.

Figure 5:
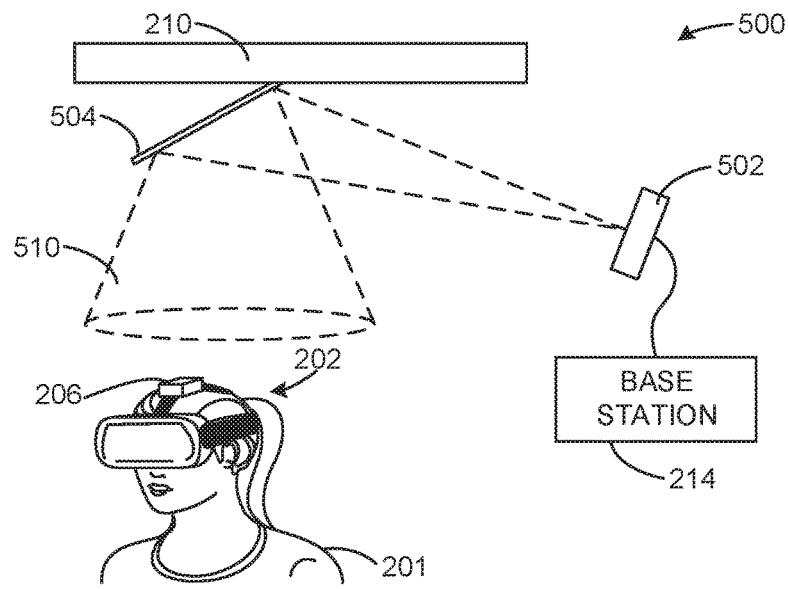
FIG. 5 illustrates an alternative example wireless virtual reality system.

FIG. 5 illustrates an alternative example wireless virtual reality system 500. The example virtual reality system 500 is similar to the wireless virtual reality system 300 and the wireless virtual reality system 400, but instead operates by reflecting signals from an overhead support or ceiling mounted position (e.g., on a roof, an elevated support structure, etc.) to the wearable device 202. As a result, in this example, cabling is not required to the fixture 210, thereby reducing or eliminating any wiring/cabling along walls and/or ceilings that may be necessitated by overhead mounting of an antenna. The virtual reality system 500 of the illustrated example includes an antenna or transceiver 502, and an overhead reflector 504 mounted to the fixture 210. In this example, the reflector 504 is angled from horizontal (e.g., 5 to 40 degrees from a horizontal plane and/or ground or any other suitable angle based on the location of the base station antenna), and/or a surface of the fixture 210 (e.g., a ceiling surface, etc.).

To maintain relatively high data rates between the antenna 206 and the base station 214, the antenna 502 is oriented in a direction generally towards the reflector 504 and, in turn, the reflector 504 reflects a signal from the antenna 502 towards the antenna 206, thereby defining a signal coverage area 510 that encompasses the user 201. In this example, the antenna 502 is circular polarized and/or diversity polarized. Additionally or alternatively, the antenna 206 is circular polarized and/or diversity polarized.

In this example, the reflector 504 is composed of a metal material (e.g., steel, aluminum, etc.). In some examples, the reflector 504 is composed of a metal sheet or a metal mesh (e.g., similar to a microwave oven mesh, a sheet metal mesh, etc.). However, any other appropriate material may be used, including non-metal materials. For example, polymers with embedded metallic materials and/or conductive polymers may be used as long as they do not attenuate the signal below a usable level. In this example, the antenna 502 and the base station 214 are communicatively coupled via an HDMI or Thunderbolt signal protocol. However, any other appropriate protocol or transmission standard may be used.

Figure 6:
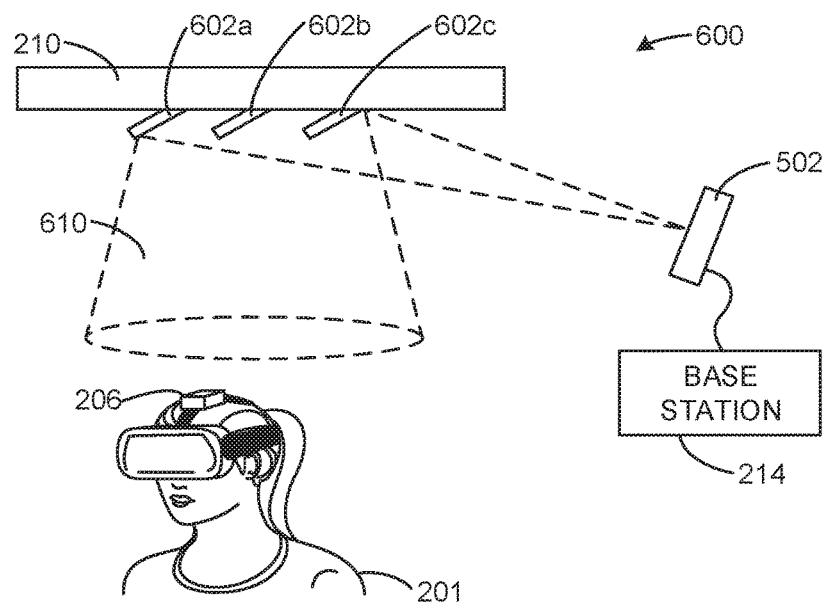
FIG. 6 illustrates another example alternative wireless virtual reality system.

FIG. 6 illustrates another example alternative wireless virtual reality system 600, which is similar to the virtual reality system 500 described above in connection with FIG. 5. However, instead of having a single reflector, the virtual reality system of the 600 of the illustrated example includes reflective panels 602 (hereinafter 602a, 602b, 602c, etc.) mounted to the fixture 210. In other words, the virtual reality system 600 includes an array of the reflective panels 602.

According to the illustrated example, the base station 214 is communicatively coupled to the antenna 502 that is oriented in a general direction towards the reflective panels 602 and/or the fixture 210. In turn, the downward reflections of signals, such as WiGig beam signals, transmitted by the antenna 502 define a signal coverage area 610 that is generally broadly distributed around the user 201. In this example, the reflective panels 602 have a relatively low profile height compared to the signal reflector 504 of FIG. 5, thereby saving vertical space.

While three of the panels 602 are shown in the illustrated example, any appropriate number of the panels 602 may be used (e.g., five, fifteen, thirty, one hundred, etc.) dependent on the application and/or an expected area of movement of the user 201. In some examples, at least one of the panels 602 is oriented differently from others of the panels 602. In some examples, at least some of the panels 602 are actuated and/or movable to be oriented (e.g., for adjustment and/or mechanical steering to track the user 201).

Figure 7:
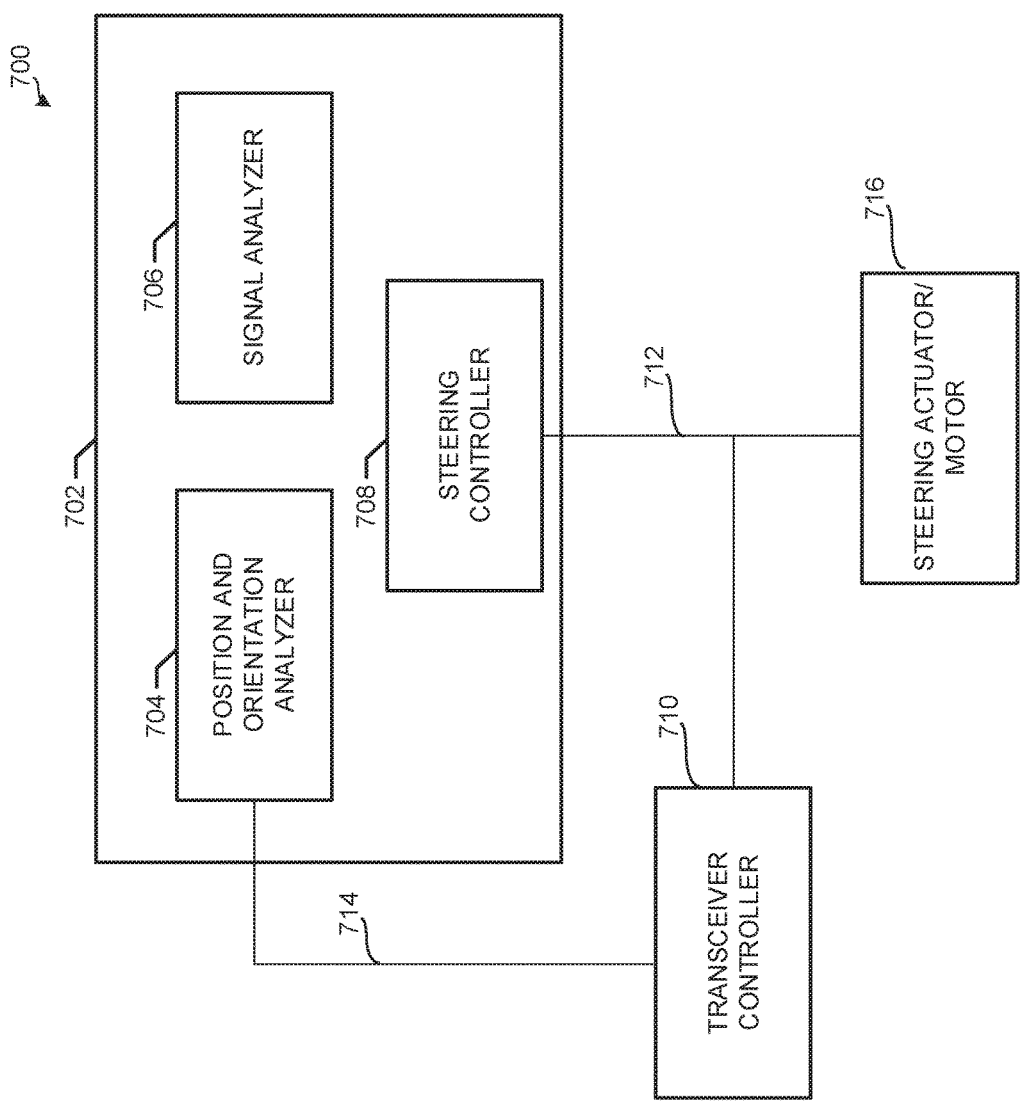
FIG. 7 is a schematic overview of an example steering control system that may be implemented with or in conjunction with the examples disclosed herein.

FIG. 7 is a schematic overview of an example steering control system 700 that may be optionally implemented with or in conjunction with the examples disclosed herein to enhance maintenance of greater coverage distances. In particular, beam steering enables coverage ranges to increase by moving/shifting the coverage area of at least one of the antennas. For example, the steering control system 700 may be implemented in the antenna 206, the antenna 208, the wearable device 202, the goggles 204, the antenna 402, the antenna 502 and/or the base station 214.

According to the illustrated example, the steering control system 700 includes a beam steering calculator 702 which, in turn, includes a position and orientation analyzer 704, a signal analyzer 706 and a steering controller (e.g., a beam steering controller) 708. The example steering control system 700 also includes a transceiver controller 710 that is communicatively coupled to the steering controller 708 via a communication line 712, as well as the position and orientation analyzer 704 via a communication line 714. Additionally or alternatively, in some examples, the steering control system 700 includes a steering actuator/motor 716, which may be implemented as a three-axis gimbal for example.

To track and/or evaluate a movement (e.g., a lateral movement, a bending movement, a rate of movement, etc.) of the user 201 and, accordingly, direct beam steering, the position and orientation analyzer 704 of the illustrated example calculates and/or determines a position and/or relative movement of the user 201 based on signals and/or signal strength measurements determined by the signal analyzer 706. For example, the signal analyzer 706 determines a direction of movement of the user 201 away from a corresponding coverage zone based on characterizing measured decreasing signal strength from an antenna. In turn, the position and orientation analyzer 704 of the illustrated example calculates (e.g., triangulates) a position or movement vector of the user 201 away from the corresponding coverage zone. Additionally or alternatively, the signal analyzer 706 maps signal strength based on different relative positions of the user 201 by using previously measured signal strength measurements.

To direct beam steering of an antenna towards the wearable device 202 based on the tracked movement of the user 201, the example steering controller 708 directs beam steering via the transceiver controller 710. Additionally or alternatively, the steering controller 708 directs movement of the steering actuator/motor 716 towards the user 201 and/or a predicted movement of the user 201. In other words, directional control of any of the antennas disclosed herein (e.g., wearable/head mounted or wired to a computer) may be implemented via beam steering or mechanical movement/actuation. In other examples, light markers and/or camera-based tracking is used to supplement tracking of the user. Additionally or alternatively, the steering actuator/motor 716 is used to move and/or angle the reflective panel 504 or the reflective panels 602. For example, different panels of the reflective panel 602 may be angled differently relative to one another.

While an example manner of implementing the steering control system 700 of FIG. 7 is illustrated in FIG. 7, one or more of the elements, processes and/or devices illustrated in FIG. 7 may be combined, divided, re-arranged, omitted, eliminated and/or implemented in any other way. Further, position and orientation analyzer 704, the example signal analyzer 706, the example steering controller 708 and the example transceiver controller 710 and/or, more generally, the example steering control system 700 of FIG. 7 may be implemented by hardware, software, firmware and/or any combination of hardware, software and/or firmware. Thus, for example, any of the example position and orientation analyzer 704, the example signal analyzer 706, the example steering controller 708 and the example transceiver controller 710 and/or, more generally, the example steering control system 700 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, position and orientation analyzer 704, the example signal analyzer 706, the example steering controller 708, and/or the example transceiver controller 710 is/are hereby expressly defined to include a non-transitory computer readable storage device or storage disk such as a memory, a digital versatile disk (DVD), a compact disk (CD), a Blu-ray disk, etc. including the software and/or firmware. Further still, the example steering control system 700 of FIG. 7 may include one or more elements, processes and/or devices in addition to, or instead of, those illustrated in FIG. 7, and/or may include more than one of any or all of the illustrated elements, processes and devices.

Figure 8:
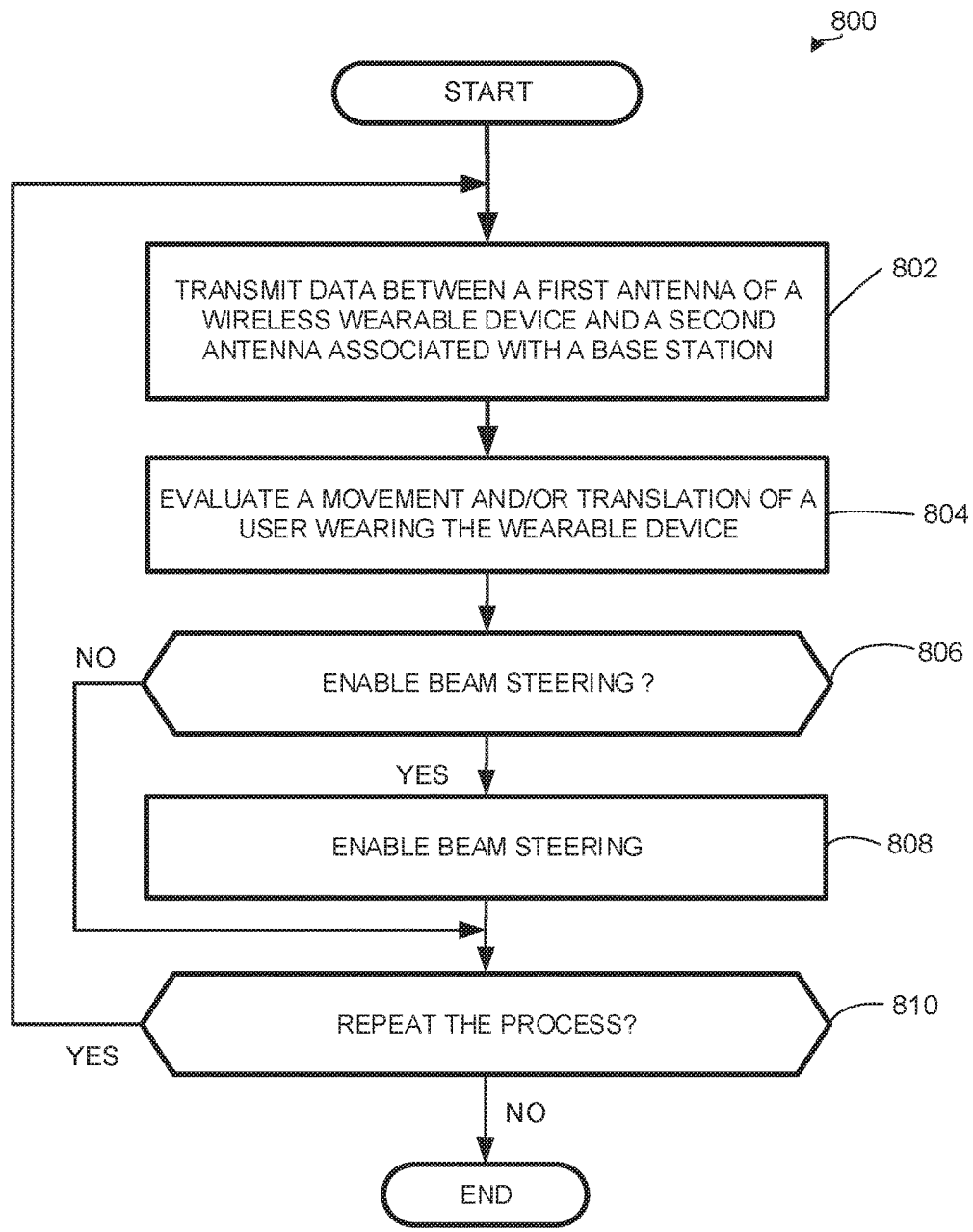
FIG. 8 is a flowchart representative of machine readable instructions that may be executed to implement the example steering control system of FIG. 7.

A flowchart representative of example machine readable instructions for implementing the steering control system 700 of FIG. 7 is shown in FIG. 8. In this example, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example steering controller 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example method 800 of FIG. 8 begins as the user 201 is using the wearable device 202 in a virtual reality application that utilizes two-way communication between the wearable device 202 and the base station 214. In particular, minimum data transmission rates are needed to maintain signal integrity of video/images that are generated/rendered (e.g., 3D rendered) by the base station 214 to be displayed by the goggles 204.

According to the illustrated example, data is transmitted between a first antenna (e.g., the antenna 206) of the wearable device 202 and a second antenna (e.g., the antenna 208) associated with the base station 214 (block 802). In this example, at least some of the data transmitted is related to graphics to be displayed by the goggles 204.

In this example, a movement and/or translation of the user 201 wearing the wearable device is evaluated (block 804). In particular, as data is transmitted between the first and second antennas (e.g., two-way communication, one-way communication), the signal analyzer 706 measures signal strength and/or maps signal strength to a position and/or directional movement of the user 201. For example, movement of the user 201 may be evaluated relative to a corresponding coverage zone of the second antenna. Based on the measurement by the signal analyzer 706, the position and orientation analyzer 704 calculates, determines and/or estimates a position or movement of the user 201. Additionally or alternatively, the position and orientation analyzer 704 predicts a movement of the user 201 out from the corresponding coverage zone based on the tracked movement.

The example position and orientation analyzer 704 then determines whether to enable beam steering (block 806). For example, the position and orientation analyzer 704 determines whether the user 201 is moving away or has moved away from a coverage zone and if the user 201 is moving away from the coverage/antenna overlap zone, beam steering is determined to be enabled.

If it is determined to enable beam steering block (806), control of the process proceeds to block 808, in which the steering controller 708 directs beam steering by directing the transceiver controller 710 (block 808). Additionally or alternatively, mechanical steering via the steering actuator/motor 716 is enabled. Otherwise, control of the process proceeds to block 810.

According to the illustrated example, it is then determine whether to repeat the process (block 810). If it is determined to repeat the process, control of the process proceeds to block 802. Otherwise, the process ends. In some examples, this determination may occur based on receiving input from the user 201 instructing cessation of a virtual reality application.

Figure 9:
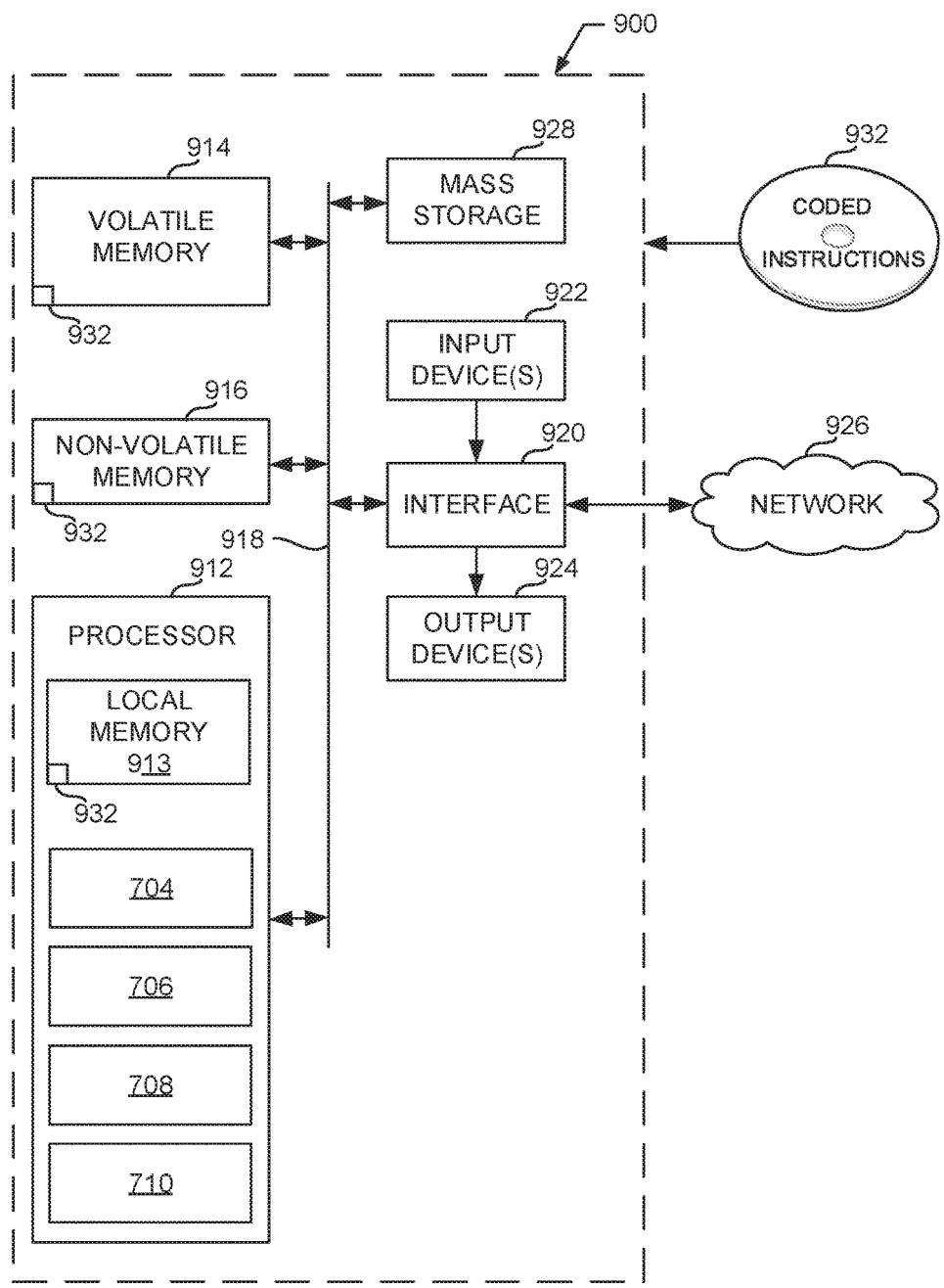
FIG. 9 is a processor platform that may be used to execute the example instructions of FIG. 8 to implement the example steering control system of FIG. 7.

FIG. 9 is a block diagram of an example processor platform 900 capable of executing the instructions of FIG. 8 to implement the steering control system 700 of FIG. 7. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the example position and orientation analyzer 704, the example signal analyzer 706, the example steering controller 708 and the example transceiver controller 710.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 8 may be stored in the mass storage device 928, in the volatile memory 914, in the non-volatile memory 916, and/or on a removable tangible computer readable storage medium such as a CD or DVD.

Example 1 includes an overhead wireless transmission interface apparatus including a fixture to be mounted above a wearable device, the wearable device having a first antenna, and a base station associated with a second antenna, where the second antenna is coupled to the fixture and is to wirelessly communicate with the first antenna, and where at least one of the first antenna or the second antenna is circular polarized or diversity polarized.

Example 2 includes the subject matter of Example 1, where the first antenna and the second antenna have matching polarizations.

Example 3 includes the subject matter of any one of Examples 1 or 2, where the wearable device is a virtual reality headset.

Example 4 includes the subject matter of any one of Examples 1 to 3, where the first antenna is to face upwards in a direction generally towards the fixture when a user wearing the wearable device is positioned beneath the fixture.

Example 5 includes the subject matter of any one of Examples 1 to 4, and further includes a third antenna operatively coupled to the fixture, the third antenna having a different polarization from the second antenna.

Example 6 includes the subject matter of any one of Examples 1 to 5, where the fixture is a ceiling.

Example 7 includes the subject matter of any one of Examples 1 to 6, and further includes a steering controller to direct beam steering of at least one of the first or second antennas.

Example 8 includes a wireless virtual reality headset including display goggles to display an image, and a wireless transceiver, where the wireless transceiver has a first antenna mounted to an upper portion of the virtual reality headset and is to be oriented in a generally upward direction from ground towards an overhead fixture that is coupled to a second antenna or a signal reflector associated with the second antenna, and where the second antenna is associated with a base station to generate the image.

Example 9 includes the subject matter of Example 8, and further includes a leveler to maintain the second antenna oriented in the generally upward direction.

Example 10 includes the subject matter of any one of Examples 8 or 9, and further includes a beam steering controller, and an actuator to be directed by the beam steering controller to maintain alignment of the first antenna to the second antenna.

Example 11 includes the subject matter of any one of Examples 8 to 10, where at least one of the first antenna or the second antenna is circular polarized or diversity polarized.

Example 12 includes a wireless transmission interface apparatus including a fixture to be positioned above a wearable device, where the wearable device has a first antenna, and a signal reflector operatively coupled to the fixture, where the signal reflector is to communicatively couple the first antenna to a second antenna associated with a base station, and where at least one of the first antenna or the second antenna is circular polarized or diversity polarized.

Example 13 includes the subject matter of Example 12, where the signal reflector is angled from a horizontal plane defined by a ground above which the fixture is positioned.

Example 14 includes the subject matter of any one of Examples 12 or 13, where the signal reflector includes an array of reflective panels.

Example 15 includes the subject matter of any one of Examples 12 to 14, where the first antenna and the second antenna have matching polarizations.

Example 16 includes the subject matter of any one of Examples 12 to 15, where the wearable device is a wireless virtual reality headset.

Example 17 includes the subject matter of any one of Examples 12 to 16, where the first antenna is to face upwards in a direction generally towards the fixture when a user wearing the wearable device is positioned beneath the fixture.

Example 18 includes the subject matter of any one of Examples 12 to 17, and further includes a third antenna to be communicatively coupled to the first antenna via the signal reflector, the third antenna having a different polarization from the second antenna.

Example 19 includes the subject matter of any one of Examples 12 to 18, where the third antenna is oriented orthogonally to the second antenna.

Example 20 includes the subject matter of any one of Examples 12 to 19, where the fixture is a ceiling.

Example 21 includes a method including transmitting data between a first antenna associated with a base station and a second antenna associated with a wireless wearable device, where at least one of the first antenna or the second antenna is circular polarized or diversity polarized, evaluating a movement of a user wearing the wireless wearable device, and based on the evaluated movement of the user, enabling beam steering of at least one of the first antenna or the second antenna.

Example 22 includes the subject matter of Example 21, where evaluating the movement includes determining a lateral movement or a bending movement of the user.

Example 23 includes the subject matter of any one of Examples 21 or 22, where evaluating the movement includes determining a rate of movement of the user.

Example 24 includes the subject matter of any one of Examples 21 to 23, where the first antenna is to generally face towards a signal reflector.

Example 25 includes a tangible machine readable medium comprising instructions, which when executed, cause a processor to at least evaluate a movement of a user wearing the wireless wearable device based on transmitted data between a first antenna associated with a base station and a second antenna associated with a wireless wearable device, where at least one of the first antenna or the second antenna is circular polarized or diversity polarized, and based on the evaluated movement of the user, enable beam steering of at least one of the first antenna or the second antenna.

Example 26 includes the subject matter of Example 25, where the instructions cause the processor to direct the beam steering.

Example 27 includes the subject matter of any one of Examples 25 or 26, where the evaluation of the movement includes determining a lateral movement or a bending movement of the user.

Example 28 includes the subject matter of any one of Examples 25 to 27, where the evaluation of the movement includes determining a rate of movement of the user.

From the foregoing, it will be appreciated that example methods, apparatus and articles of manufacture have been disclosed that provide a cost-effective and stable high bandwidth data connections between a wireless wearable device and a corresponding base station. The examples disclosed herein enable high bandwidth data transmission rates even when a user wearing an antenna is making significant movements and/or rotations, thereby preventing or eliminating any potential reduction in data transmission rates that may significantly impair a user experience.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are directed to virtual reality system data transmissions, the examples disclosed herein may be applied to any appropriate data communication applications involving relatively narrow transmission fields/beams.

What is claimed is:

1. An overhead wireless transmission interface apparatus comprising:
    a fixture to be mounted above a wearable device, the wearable device having a first antenna;
    an array of reflective panels mounted to the fixture, the reflective panels angled from a horizontal plane defined by a surface above which the fixture is positioned; and
    a base station associated with a second antenna, the second antenna coupled to the fixture and to wirelessly communicate with the first antenna via the array of reflective panels, wherein at least one of the first antenna or the second antenna is circular polarized or diversity polarized.

2. The overhead wireless transmission interface apparatus as defined in claim 1, wherein the first antenna and the second antenna have matching polarizations.

3. The overhead wireless transmission interface apparatus as defined in claim 1, further including the wearable device, wherein the wearable device is a virtual reality headset.

4. The overhead wireless transmission interface apparatus as defined in claim 1, further including the wearable device, wherein the first antenna is to face upwards in a direction generally towards the fixture when a user wearing the wearable device is positioned beneath the fixture.

5. The overhead wireless transmission interface apparatus as defined in claim 1, further including a third antenna operatively coupled to the fixture, the third antenna having a different polarization from the second antenna.

6. The overhead wireless transmission interface apparatus as defined in claim 1, wherein the fixture is mounted to a ceiling.

7. The overhead wireless transmission interface apparatus as defined in claim 1, further including a steering controller to direct beam steering of at least one of the first or second antennas.

8. The overhead wireless transmission interface apparatus of claim 1, further comprising a wireless virtual reality headset, the wireless virtual reality headset including:
    display goggles to display an image; and
    a wireless transceiver, the wireless transceiver having a in communication with the first antenna.

9. The wireless virtual reality headset as defined in claim 8, further including a leveler to maintain the second antenna oriented in the generally upward direction.

10. The wireless virtual reality headset as defined in claim 8, further including:
    a beam steering controller; and
    an actuator to be directed by the beam steering controller to maintain alignment of the first antenna to the second antenna.

11. The overhead wireless transmission interface apparatus as defined in claim 1, further including an actuator to direct movement of the reflective panels.

12. The overhead wireless transmission interface apparatus as defined in claim 11, wherein the actuator is to move the reflective panels based on a detected movement of a user wearing the wearable device.

13. A wireless transmission interface apparatus comprising:
    a fixture to be positioned above a wearable device, the wearable device having a first antenna; and
    a signal reflector operatively coupled to the fixture, the signal reflector including an array of reflective panels angled from a horizontal plane defined by a surface above which the fixture is mounted, the signal reflector to communicatively couple the first antenna to a second antenna associated with a base station, wherein at least one of the first antenna or the second antenna is circular polarized or diversity polarized.

14. The wireless transmission interface apparatus as defined in claim 13, wherein the first antenna and the second antenna have matching polarizations.

15. The wireless transmission interface apparatus as defined in claim 13, wherein the wearable device is a wireless virtual reality headset.

16. The wireless transmission interface apparatus as defined in claim 13, wherein the first antenna is to face upwards in a direction generally towards the fixture when a user wearing the wearable device is positioned beneath the fixture.

17. The wireless transmission interface apparatus as defined in claim 13, further including a third antenna to be communicatively coupled to the first antenna via the signal reflector, the third antenna having a different polarization from the second antenna.

18. The wireless transmission interface apparatus as defined in claim 17, wherein the third antenna is oriented orthogonally to the second antenna.

19. The wireless transmission interface apparatus as defined in claim 13, wherein the fixture is mounted to a ceiling.

* * * * *

UNITED STATES PATENT AND TRADEMARK OFFICE
CERTIFICATE OF CORRECTION

PATENT NO. : 10,439,657 B2
APPLICATION NO. : 15/668534
DATED : October 8, 2019
INVENTOR(S) : Pillai et al.

Page 1 of 1

It is certified that error appears in the above-identified patent and that said Letters Patent is hereby corrected as shown below:

In the Claims

Column 14, Line 27, Claim 8:
After "wireless transceiver" delete "having a".

Signed and Sealed this
Twenty-fifth Day of February, 2020

Andrei Iancu
*Director of the United States Patent and Trademark Office*